Oct. 3, 1967  M. A. QUETTEL ET AL  3,345,493
MONITOR FOR DETECTING CHANGE IN RESISTANCE BETWEEN
WELDED PARTS DURING WELDING CURRENT FLOW
Filed Sept. 21, 1965  3 Sheets-Sheet 1

INVENTOR.
MARVIN A. GUETTEL
CHARLES F. MEYER
BY
*William H. Schmeling*

FIG. 2

INVENTOR.
MARVIN A. GUETTEL
CHARLES F. MEYER
BY William H. Schmeling

INVENTOR.
MARVIN A. GUETTEL
CHARLES F. MEYER
BY

United States Patent Office 3,345,493
Patented Oct. 3, 1967

3,345,493
MONITOR FOR DETECTING CHANGE IN RESISTANCE BETWEEN WELDED PARTS DURING WELDING CURRENT FLOW
Marvin A. Guettel and Charles F. Meyer, both of Milwaukee, Wis., assignors to Square D Company, Park Ridge, Ill., a corporation of Michigan
Filed Sept. 21, 1965, Ser. No. 489,019
18 Claims. (Cl. 219—110)

ABSTRACT OF THE DISCLOSURE

A control circuit to precisely detect a percentage change in resistance between two or more metal parts during the flow of welding current through the parts including an air core transformer which is energized by the welding current flow and provides a gating signal to control the instants of sampling the voltage drop across the parts to eliminate the effects of voltages induced by the welding current on the sampled signal and to terminate the flow of welding current when percentage difference between two sampled voltages equals a preselected value.

---

This is a continuation-in-part of now abandoned application Ser. No. 214,937, filed Aug. 6, 1962. This invention relates to electrical control systems and more particularly, to an improved resistance welder control system which is responsive to a percentage change in resistance between metal work-pieces during the formation of a resistance weld therebetween.

As presently available resistance welder controllers are capable of precisely determining welding time periods and current levels, improper adjustment of the controllers will cause incorrect time periods and current levels to be reproduced with the same precision as correct periods and levels. Because the quality of a weld is influenced by variable conditions involving the fit between the work-pieces surface contamination, electrode tip mushrooming, current shunting due to closely-adjacent, previously-formed spot welds, cable wear, varying pressures between the electrodes, and other factors, it is difficult to select proper time and current settings. Further, modern production practices require that different numbers of work-pieces of different thicknesses be successively welded without repeated manual readjustment of the controller. A welding control system according to the present invention provides such adjustment automatically.

It has been known for a number of years that the strength of a resistance weld is related to a resistance change which occurs between the work-pieces during the formation of the weld nugget, and that a signal related to this resistance change can be obtained by connecting a pair of leads to the electrodes in as close proximity to the work-pieces as is practical. The signal thus obtained, however, has a magnitude which is not only dependent upon the resistance between the work-pieces but also is influenced by the magnitude of the welding current, the resistance of the electrodes, the resistance of the work-pieces, the number and thickness of the parts being welded together, the electrode work surface resistances, and the magnetic field created by the welding current.

Many prior attempts to eliminate or minimize the effects of these extraneous influencing factors in a commercially acceptable welding control system have been made, but have been generally unsuccessful. A welding control system according ot the present invention provides an accurate measure of the critical resistance in a novel manner and utilizes the measurement in a novel manner to terminate the flow of welding current when an acceptable weld has been completed.

It has been suggested that the effect of the magnetic field can be minimized if the voltage across the electrodes is sampled to provide a signal only when the instantaneous value of the alternating welding current is a maximum. At this instant, the rate of change of the welding current with time is a minimum, and the inductive component in the voltage at the pick-up leads is negligible. Prior attempts to use this sampling technique to provide a control signal when the arithmetic change in resistance equalled some fixed value did not result in commercially acceptable or even in operative systems.

The present invention can be embodied in a commercially acceptable monitor for use with a welder controller and which precisely detects a percentage change in resistance which occurs between two or more work-pieces of varying thickness during formation of a weld therebetween. The monitor includes a pair of leads which are preferably attached to the electrodes as close to the work-pieces as practicable. The leads, during the flow of welding current, supply a voltage signal which is merely indicative of the resistance between the work-pieces and not proportional to the actual resistance therebetween because of the spurious voltages which are included in the voltage signal. As mentioned, one of these spurious voltages results from inductive effects. The effect of this voltage is eliminated by the present monitor by use of an air core transformer which is energized by the welding current flow to supply gating signals at the precise instants when the inductive effects of the welding current are a minimum. These gating signals are used to control the instants of sampling of the voltage signal so that the voltage signal thus obtained is not affected by induced voltages. Additionally, the monitor uses an iron core transformer which is also energized by the welding current flow to supply a signal which compensates the sampled voltage signal for electrode resistance and for variations in welding current that occur. The monitor also includes a means for delaying for a predetermined adjustable time interval the transmission of the compensated signal.

The compensated voltage signal is used to charge a pair of capacitors. One of the capacitors acts as a memory and maintains a charge indicative of the highest value of the sampled compensated voltage signal and the other capacitor is charged to potentials indicative of the instantaneous values of the compensated voltage signal. False signal voltages that are not representative of the resistance at the weld are not impressed on the capacitors. Further, the monitor includes an electronic switch, preferably a unijunction transistor, which when the percentage difference between the charges on the two capacitors reaches a predetermined value, supplies an output signal to a NOR logic circuit to either terminate the welding current or to supply an output signal indicating that an improper weld has been formed. The use of the switch which responds to a percentage difference between the charges on the two capacitors permits the control system to accurately detect the completion of satisfactory welds between a varying number of laminated parts and/or parts of varying thickness, a result not possible in systems which merely detect the arithmetic difference between the charges on the capacitors.

It is an object of the present invention to provide a control system for a resistance welder which separates the resistive and inductive components in a voltage signal resulting from the flow of welding current and uses only the resistive component to control the flow of welding current or to provide an output signal.

It is another object to provide a control system for use with a resistance welder which eliminates, from the voltage drop across the electrodes, variations due to supply voltage changes and variations in welding current flow as caused by changes in resistance between the parts being welded, the induced voltage component, and the voltage drop in the electrodes, and which thereby detects a change in the resistance between the work-pieces to provide a signal for actuating a logic circuit when the percentage change exceeds a predetermined value.

For carrying out the foregoing objects, it is another object to provide improved logic circuitry which produces an output signal when an input signal occurs before the end of a predetermined time interval.

Still another object is to provide improved logic circuitry which produces an output signal when the input signal is not present during a predetermined time interval.

Another object is to provide a control system for use with a resistance welder which responds to changes in the resistance between the work-pieces by means of logic circuitry and thereby terminates the flow of welding current if a predetermined percentage change in the resistance occurs during the weld interval and to actuate an indicating means if the predetermined percentage change in the resistance fails to occur.

A further object is to provide a control system which detects the percentage change in resistance across the electrodes of a resistance welder in response to the flow of welding current through work-pieces positioned between the electrodes and which system includes means comprising an air core transformer, for separating the resistive from the inductive components of the detected voltage, and means for compensating the detected resistive component for voltage drops in the material of the electrodes and for current changes resulting from line voltage fluctuations.

Other objects are to provide means to delay the detection of the voltage change occuring across work-pieces being welded for a predetermined number of cycles of welding current, to provide means for comparing the initial detected voltage signal with a subsequent detected voltage signal of lesser magnitude, to provide an output signal when the percentage difference between the compared signals exceeds a predetermined value, and to provide a logic circuit having means for delaying the use of the output signal for a further time interval to permit the difference between the signals to be established for a time interval.

Further objects and features of the invention will be readily apparent from the following specification and appended drawings, in which.

Figure 1:
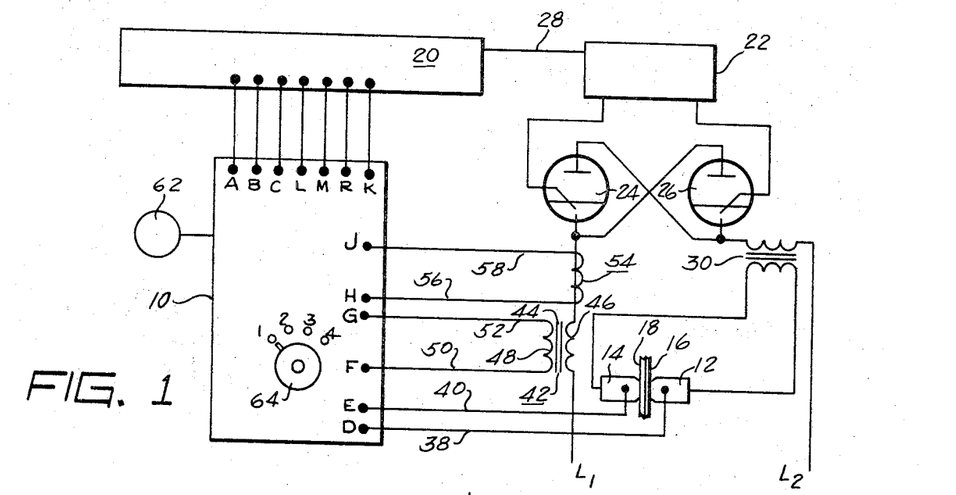
FIG. 1 diagrammatically shows how a monitor according to the present invention is connected to a weld timer and a welder controller thereby to provide an improved control system for a resistance welder.

In FIG. 1, a controller or monitor 10 for monitoring variations in the resistance across a load in response to current flow through the load and constructed in accordance with this invention is shown in conjunction with a resistance welder comprising a pair of electrodes 12 and 14 movable by means not shown into clamping engagement with two or more metal work-pieces such as the work-pieces 16 and 18 which may vary in thickness or otherwise vary in electrical resistance.

Although the monitor 10 is described herein as used with a resistance welder, it will become apparent that it has other uses in the detection and monitoring of resistance changes. Further, although the monitor 10 may be used with any suitable weld timer, a weld timer of the type disclosed in the United States Patent No. 3,243,652 issued Mar. 3, 1967, on an application Serial No. 129,828, filed Aug. 7, 1961, by the inventors Charles F. Meyer and James J. Eckl, is particularly suitable. Such a weld timer is indicated at 20, and as is conventional, is arranged to provide output signals to a conventional welder controller 22 which in turn provides suitable signals to a pair of back-to-back connected ignitrons 24 and 26 arranged to control the flow of alternating current from a pair of supply leads L1 and L2 to the electrodes 12 and 14. The particular form of the controller 22 is unimportant insofar as the present invention is concerned, and, hence, will not be further described.

The weld timer 20 is arranged to control the duration of "squeeze," "weld," "hold," and "off" periods, as is well known in the resistance welding art. If desired, the weld timer 20 may also provide a "squeeze delay" period. During the squeeze period the electrodes 12 and 14 move into engagement with the work-pieces 16 and 18 under predetermined pressure. At the end of the squeeze period, the timer 20 provides a suitable series of signals which are carried by a lead 28 to the controller 22 thereby to cause the ignitrons 24 and 26 to fire in a lead-trail fashion to pass alternate half cycles of alternating current through the primary winding of a welding transformer 30 having a secondary winding connected to the welding electrodes 12 and 14. If desired, the weld timer 20 and the welder controller 22 may also cause the ignitrons 24 and 26 to conduct for less than full half cycles of the alternating current supply to provide "heat control" for the welding apparatus. The timer 20 should also provide for delayed firing during the initial half cycle of conduction of the lead ignitron to minimize surge current transients in the welding transformer 30.

Figure 7:
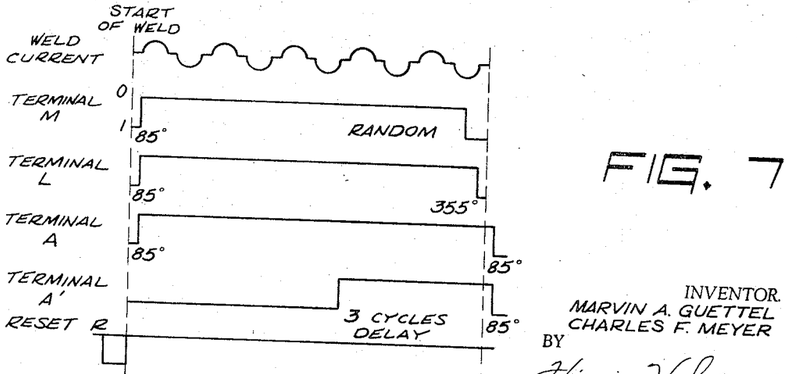
FIG. 7 is a graph of some of the input signals to the logic circuit portion of the monitor.

The weld timer 20 is also arranged to provide signals to be hereinafter described through suitable leads to a plurality of terminals A, B, C, L, M, and R of the monitor 10. The signals supplied to the terminals B and C are negative voltage pulses delivered simultaneously with the lead-trail firing of the ignitrons 24 and 26. The signals supplied to the terimnals A, L, and M, shown graphically in FIG. 7, are negative during the squeeze, hold, and off periods and are discontinued during the weld period which preferably begins 85° after a zero point on the supply voltage wave. The signal to the terminal A is re-established at 85° after a zero point on the next wave of the supply voltage after termination of the weld period and the signal at L is re-established at 355° after a zero point of the supply voltage wave during the last half cycle of the welding current. The signal to the terminal M is re-established at a random point prior to said 355° point during the last half cycle of welding current. The signal at R, not shown in FIG. 7, is a negative voltage pulse which occurs at the end of the squeeze period.

The monitor 10 has a plurality of signal-receiving input terminals D, E, F, G, H, and J. The terminals D and E are connected through suitable leads 38 and 40 to the electrodes 12 and 14, respectively, so as to provide a pick-up signal which is a function of the voltage appearing across the electrodes in response to the flow of welding current. The pick-up signal is the sum of the voltage drops in the electrodes 12 and 14, the work pieces 16 and 18, the surface resistances between the electrodes and the workpieces 16 and 18 and also includes a variable induced voltage component. Because one of the purposes of the monitor 10 is to precisely detect changes in the interface resistance, preferably the leads 38 and 40 should be connected to detect only the interface resistance and to exclude the effects of the other resistances listed above. From a practical standpoint, however, it is desirable to connect the leads 38 and 40 directly to the electrodes 12 and 14 and to compensate the signal supplied to the terminals D and E for the effects of the other resistances in a manner to be explained.

A current transformer 42 having an iron core 44 has its primary winding 46 effectively in series with the electrodes 12 and 14 by being connected in series with the primary winding of the transformer 30. The transformer 42 has a secondary winding 48 connected by a pair of leads 50 and 52 to the terminals F and G. Thus, any variations in current through the welding electrodes 12 and 14 is reflected as a voltage change at the terminals F and G. The utilization of this voltage change will be hereinafter described.

An air-core current transformer 54 is arranged to be energized by the current in the circuit which includes the transformer 30 and the welding electrodes 12 and 14. Preferably, the transformer 54 comprises one or more turns of wire about a lead which carries current to the welding electrodes 12 and 14 to form a secondary winding which has its respective ends connected through the leads 56 and 58 to the terminals J and H, respectively, thereby to provide a voltage signal at the terminals J and H which is a function of the welding current and which is substantially ninety degrees out of phase with the welding current.

In order for the voltage signal at the terminals H and J to be ninety degrees out of phase with the welding current, it is important that the secondary circuit of the transformer 54 have a large resistance relative to its reactance. If the transformer 54 were an iron core transformer, this would not be possible because the reactance of the transformer would be so large that the voltage across the load circuit fed from the terminals H and J would be substantially 180° out of phase with the welding current. Because the present invention requires that the voltage at the terminals H and J be ninety degrees out of phase with the welding current, the transformer 54 has an air core so that its reactance can be so small relative to its resistance as to be negligible. The induced voltage in the secondary winding of the transformer 54 is ninety degrees out of phase with the welding current and, because the resistance of the secondary circuit is so much larger than the reactance, the voltage across the load circuit fed from the terminals H and J is substantially ninety degrees out of phase with the welding current.

The monitor 10 has an output terminal K connected through a lead to provide an input signal to the weld timer 20 and also has an indicating lamp 62 as well as a four-position, externally-adjustable selector switch 64.

Figure 2:
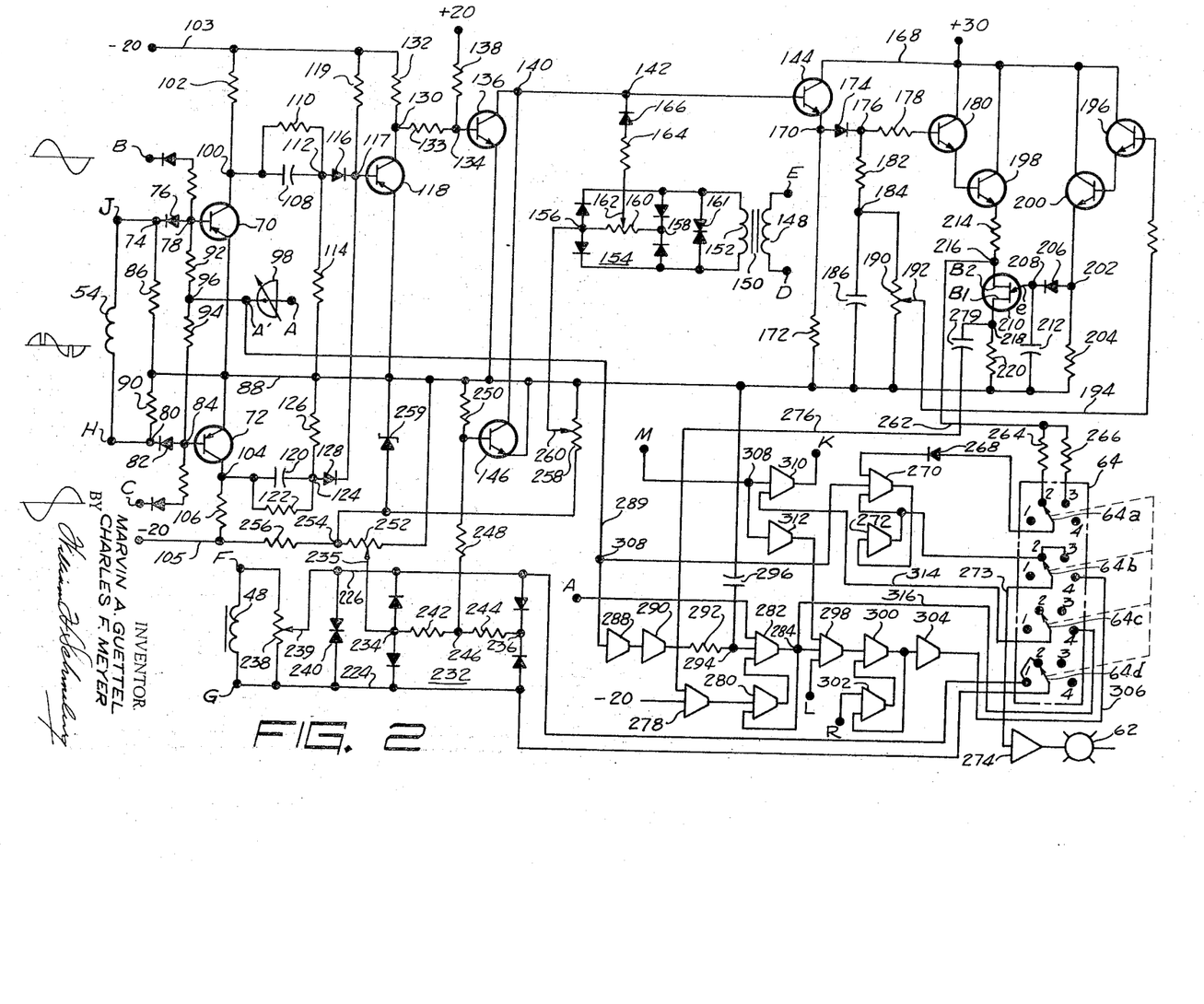
FIG. 2 schematically shows a wiring diagram of the monitor of FIG. 1 with certain components of the logic-circuitry portion thereof symbolically illustrated.

CIRCUITRY OF FIG. 2

In FIG. 2, which is an elementary wiring diagram of the monitor 10 of FIG. 1, the input terminals A, B, C, D, E, F, G, H, J, L, M, and R and the output terminal K, the indicating light 62, and the selector switch 64 of FIG. 1 are indicated by the same letters and numerals as in FIG. 1.

As shown in FIG. 2, one of the terminals of the secondary winding of the air-core current transformer 54 is connected through the terminal J, a junction 74, a reversed diode 76, and a junction 78 to the base of a PNP type transistor 70, and the other terminal of the secondary winding of the transformer 54 is connected through the input terminal H, a junction 80, a reversed diode 82, and a junction 84 to the base of a PNP type transistor 72. The junctions 74 and 80 are connected respectively through a pair of resistors 86 and 90 to a lead 88, which is the common or ground lead. The junctions 78 and 84 are interconnected by a pair of series-connected resistors 92 and 94 which have a common terminal or junction 96 connected through a terminal A' and a delay unit 98 to the input terminal A. The delay unit 98 may be any suitable device which causes a change in an output signal an adjustable time interval after a change in an input signal. A circuit arrangement for accomplishing this result is set forth in the Meyer et al. application cited above.

The input terminals B and C are respectively connected to the bases of the transistors 70 and 72 through suitable blocking diodes and resistors, as shown. The emitters of the transistors 70 and 72 are connected to the common lead 88. The collector of the transistor 70 is connected through a junction 100 and a resistor 102 to a supply lead 103 which is negative with respect to the common lead 88. Similarly, the collector of the transistor 72 is connected through a junction 104 and a resistor 106 to a negative supply lead 105. In the embodiment shown, the leads 103 and 105 each provide a negative potential of twenty volts with respect to the common lead 88.

The junction 100 is connected through a parallel circuit, comprising a capacitor 108 and a resistor 110, to a junction 112 which in turn is connected through a resistor 114 to the common lead 88 and through a diode 116 and a junction 117 to the base of a PNP type transistor 118. The junction 104 similarly is connected through a parallel circuit, comprising a capacitor 120 and a resistor 122, to a junction 124 which in turn is connected through a resistor 126 to the common lead 88 and through a diode 128 and the junction 117 to the base of the transistor 118. The junction 117 is also connected through a resistor 119 to the lead 103. The transistor 118 has its emitter connected to the common lead 88 and its collector connected through a junction 130 and a resistor 132 to the lead 103.

The junction 130 is connected through a resistor 133 and a junction 134 to the base of an NPN type transistor 136. The junction 134 is connected through a resistor 138 to a source of positive voltage which, in the embodiment shown, has a positive potential of twenty volts with respect to the common lead 88. The transistor 136 has its emitter connected to the common lead 88 and its collector connected to a junction 140 which in turn is connected through a junction 142 to the base of an NPN type transistor 144 and directly to the collector of an NPN type transistor 146 having its emitter connected to the lead 88.

The input terminals E and D, which are fed from the welder electrodes 12 and 14, as shown in FIG. 1, are connected respectively to the terminals of a primary winding 148 of a transformer 150 which has a secondary winding 152. The terminals of the secondary winding 152 are connected through a suitable full wave rectifier 154 to provide full-wave rectified voltage at a pair of terminals 156 and 158. A pair of reversely-connected diodes 161 are connected across the output terminals of the secondary 152 to protect the rectifier 154 from the voltage transients appearing at the secondary 152. A potentiometer 160 connected across the terminals 156 and 158 has its slider 162 connected through a resistor 164 and a diode 166 to the junction 142.

The transistor 144 has its collector connected to a lead 168 and its emitter connected to a junction 170. The lead 168 is connected to a source of voltage which, in the embodiment illustrated, has a positive potential of thirty volts with respect to the common lead 88. The junction 170 is connected through a resistor 172 to the common lead 88 and through a diode 174, a junction 176, and a resistor 178 to the base of an NPN type transistor 180. The junction 176 is connected through resistor 182 and a junction 184 to one side of a capacitor 186 which has its other side connected to the common lead 88. The junction 184 is also connected through a potentiometer 190 to the common lead 88. The potentiometer 190 provides a discharge path for the capacitor 186 and its slider 192 is connected through a resistor 194 to the base of an NPN type transistor 196. The transistor 180 has its emitter connected to the base of an NPN type transistor 198. The transistor 196 has its emitter connected to the base of an NPN type transistor 200. Each of the transistors 198 and 200 has its collector connected to the lead 168. The transistor 200 has its emitter connected through a junction 202 and a resistor 204 to the lead 88. The junction 202 is connected through a diode 206 and a junction 208 to an emitter electrode "e" of a unijunction transistor 210 which has a pair of bases B1 and B2. A capacitor 212 is connected between the junction 208 and the lead 88. The emitter of the transistor 198 is connected through a resistor 214 and a junction 216 to the base B2 of the unijunction transistor 210. The base B1 of the unijunction transistor 210 is connected through a junction 218 and a resistor 220 of the lead 88.

The input terminals G and F which are supplied from the secondary 48 of the iron-core current transformer 42 are respectively connected through a pair of leads 224 and 226 to the input terminals of a full-wave rectifier 232 having a pair of output terminals 234 and 236. A rheostat 238 connected across the secondary 48 provides a continuous load across the current transformer secondary winding 48 and may be used to vary the potential impressed on the rectifier 232. A voltage transient suppressor 240 is connected across the leads 224 and 226 to protect the diodes of the rectifier 232. A pair of series-connected resistors 242 and 244, interconnected at a junction 246, are connected across the output terminals 234 and 236 of the rectifier 232, and the junction 246 is connected through a pair of series-connected resistors 248 and 250 to the lead 88. The base of the transistor 146 is connected to a junction between the resistors 248 and 250. The terminal 234 is connected to a slider 235 of a potentiometer 252 which is interposed in series with a junction 254 and a resistor 256 between the lead 88 and the negative supply lead 105. The junction 254 is connected through a potentiometer 258 to the lead 88, the voltage between the junction 254 and the lead 88 being limited by a zener diode 259. The potentiometer 258 has its slider 260 connected to the junction 156.

The lower right-hand portion of FIG. 2 comprises a plurality of NOR logic elements, shown symbolically. The circuitry of the individual NOR elements is well known, as is described in the application previously cited. The switch 64 is shown schematically as a multi-deck switch comprising four separate four-position switches 64a, 64b, 64c, and 64d having their respective movable contact arms mechanically interconnected for simultaneous movement, as indicated by broken lines.

A lead 262 connects the junction 216 between electrodes of the transistors 198 and 210 to the second and third contacts of the switch 64a through a pair of resistors 264 and 266, respectively. The movable arm of the switch 64a is connected through a diode 268 to an input of a NOR 270 which is connected with a NOR 272 as a NOR memory. The output of this NOR memory is taken as the output of the NOR 272 and is connected to the second and third contacts of the switch 64b. The movable arm of the switch 64b is connected through a lead 273 and an amplifier 274 to the lamp 62.

A NOR 278 receives a continuous negative 20 volt input signal and, by means of a lead 276, also receives a second input signal through a capacitor 279 from the junction 218. The output of the NOR 278 is connected to an input of a NOR 280 which is connected with a NOR 282 as a NOR memory, the output of which is taken as the output of the NOR 282 at a junction 284. The NOR 282 also receives an input from the terminal A. The terminal A', which receives a delayed signal from the terminal A, is connected through a lead 289 and a junction 308 to an input of a NOR 288 which has an output connected as an input to a NOR 290. The output of the NOR 290 is connected as an additional input to the NOR 282 through a resistor 292 and a junction 294 which is connected through a capacitor 296 to the common lead 88. The junction 284 is also connected to an input of a NOR 298 having an output connected as an input to a NOR 300 which is paired with a NOR 302 as a NOR memory, the output of which is taken from the NOR 300 and connected through a NOR 304 and a lead 306 to the fourth terminal of the switch 64b. The terminal A' is additionally connected through the lead 289 and the junction 308 to an input of the NOR 270. The terminal M is connected to inputs of each of a pair of NOR's 310 and 312, the output of the NOR 212 being connected to an input of the NOR 298. The output of the NOR 310 is connected to the terminal K. An additional input to the NOR 310 is connected through a lead 314 to the movable arm of the switch 64c. The NOR 298 has an additional input connected to the terminal L. The junction 284 is also connected through a lead 316 to the fourth terminal of the switch 64c. The terminals F and G are connected, through extensions of the leads 224 and 226, to the first and second terminals of the switch 64c, respectively. The NOR 302 has an additional input connected to the terminal R.

OPERATION

The operation of the complete control system, including the monitor 10 as shown in FIG. 2, and the welder timer 20, the welder controller 22, and the welder of FIG. 1, will now be described, reference being had to the graphs of FIG. 3–6.

Figure 3:
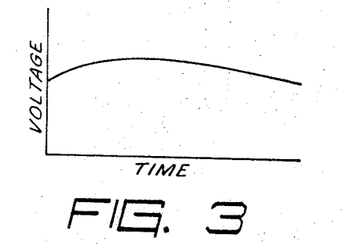
FIG. 3 is a curve showing typical variations in resistance during the flow of welding current through work-pieces.

FIG. 3 is a curve showing the change in resistance that typically occurs across work-pieces such as the work-pieces 16–18 during formation of a resistance weld therebetween. As shown by FIG. 3, a gradual increase in this resistance occurs at the beginning of the weld period when the work-pieces start to heat. This increase in resistance is followed by a relatively stable period of resistance which in turn is followed by a decrease in resistance as the metal melts and a weld nugget starts to form.

Figure 4:
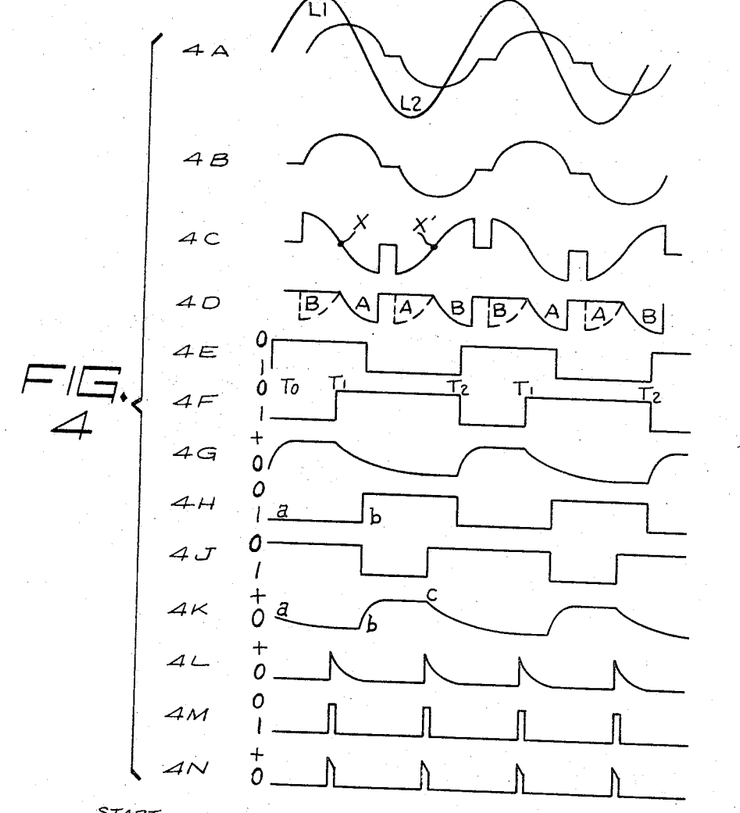
FIG. 4 is a group of theoretical curves showing signals provided and utilized by the monitor of FIGS. 1 and 2.

In FIG. 4, a curve 4A shows the alternating voltage wave of the source and a curve 4B shows a theoretical wave form of the welding current at a typical setting of the heat control means of the welder controller 22. The air core current transformer 54, in response to the welding current flow illustrated by the curve 4B, provides an output signal at the terminals J and H, which is shown by a curve 4C.

Ohm's law teaches that the voltage drop across the metal parts, in response to welding current through the parts, is equal to the current flow times the resistance across the parts or $E=IR$. Thus, if the signal from the electrodes 12 and 14 is not compensated for changes in the welding current, as may be caused by changes in the supply voltage as well as the changes in resistance across the parts being welded, the change in voltage will not be directly proportional to the changes in resistance across the parts. The monitor circuitry which includes the iron core transformer 42 is arranged to compensate the voltage signal across the leads 38 and 40 for changes in welding current flow through the electrodes 12 and 14.

The welding current also produces a strong magnetic field about the electrodes, the strength of which depends upon the magnitude of the welding current and the shape and mass of the work-pieces and other variable factors. This field induces an inductive voltage component in the leads 38 and 40 which obscures the voltage introduced in the leads 38 and 40 at the electrodes 12 and 14 by the resistance across the parts 16 and 18. The effects of this induced voltage signal at the electrodes 12 and 14 thus must be eliminated so that the voltage signal across the leads 38 and 40, which is compensated by the monitor 10 for changes in welding current flow, will be directly proportional to the change in the resistance between the parts 16 and 18. This voltage drop, caused by the resistance between the parts 16 and 18, is, of course, a maximum during each half cycle when the welding current is a maximum. Similarly, as the inductive voltage component is a function of the rate of change of current, during the instants of maximum welding current flow during each half cycle, the inductive voltage component will be at a minimum. The instant when the inductive component is at a minimum for each half cycle is detected by means of the air-core current transformer 54 which, in response to the flow of welding current (curve 4B) provides a voltage signal (curve 4C) ninety degrees out of phase therewith so that, at each maximum point on the welding current wave, the voltage signal from the transformer 54 is zero, as indicated by the points X and X' on the curve 4C. The voltage signal from the transformer 54 is impressed on the monitor 10 at the terminals J and H.

Except during the welding interval, the weld timer 20 provides a continuous negative signal to the terminal A which passes through the time delay unit 98 and the respective resistors 92 and 94 to the bases of the transistors 70 and 72 causing conduction thereof. When the welding interval begins, the negative signal to the terminal A is discontinued, preferably at 85° after a zero point on the supply voltage wave. This change in the signal at A is delayed in transmission to the terminal A' and to the transistors 70 and 72 by the delay unit 98 for three cycles so that sampling of the voltage across the electrodes 12 and 14, as hereinafter described, reflects a value uninfluenced by improper seating of the electrodes and other causes. After the negative signal at the terminal A' disappears, the transistors 70 and 72 are controlled by the signals at the terminals B, C, J, and H only.

The diodes 76 and 82 respectively block the flow of current from the junctions 74 and 80 to the bases of the transistors 70 and 72. When the terminal J is positive, current flows from the terminal J through the junction 74, the resistor 86, the lead 88, the emitter to base of the transistor 72, the junction 84, the diode 82, and the junction 80 to the terminal H. When current flows through the foregoing circuit, even if there is no signal at the terminal C, the transistor 72 conducts. Similarly, when the terminal H is positive, current flows from the terminal H through the junction 80, the resistor 90, the lead 88, the emitter to base of the transistor 70, the junction 78, the diode 76, and the junction 74 to the terminal J, causing the transistor 70 to conduct even if there is no signal at the terminal B.

The solid line portions A and B of the curve 4D respectively indicate the periods when the transistors 70 and 72 are rendered conductive by the signals at the terminals J and H in the absence of signals at the terminals B and C. The curves 4E and 4H respectively indicate the signals at the terminals B and C. When a "0" signal is present at the terminals B or C, the associated transistor 70 or 72 is biased against conduction and when a "1" signal is present, the associated transistor is conductive, provided no other biasing signal is present. However, the signal A of the curve 4D and the signal of the curve 4E are simultaneously impressed on the base of the transistor 70. When the transisor 70 is nonconductive, the potential at the junction 100, which may be considered as the output terminal of the transistor 70, is at the negative 20 volts provided by lead 103. This condition is illustrated on the cuvre 4F as "1." When the transistor 70 is conductive, the potential of the junction 100 approaches the potential of the lead 88. This is represented as a "0" on the curve 4F.

Thus, as shown by the curve 4F, prior to time T1, the signal A of the curve 4D is absent and the signal of curve 4E is "0," causing the transistor 70 to be nonconductive so that the signal at the junction 100 is "1." At a time indicated at X on the curve 4C, which is the same as the time T1 on the curve 4F, the signal A of curve 4D becomes negative which causes the transistor 70 to conduct thereby to change the signal at the junction 100 to "0." During the interval when the A signal of curve 4D is present, the signal at the terminal B changes from a "0" to a "1," as shown by the curve 4E, which causes the transistor 70 to remain conducting after the "A" signal disappears. At time T2, the "1" signal at the terminal B disappears and the transistor 70 no longer conducts, and thereby a "1" signal re-appears at the junction 100.

In a similar manner, the signal at the terminal J as shown by the curve 4D and the signal at the terminal C as shown by the curve 4H, cause the conductive state of the transistor 72 to change so that the output signal at the junction 104 changes, as shown by the curve 4J.

The curve 4G shows the charging and discharging sequence of the capacitor 108 as it would be if controlled by the conduction of the transistor 70 alone. As is seen from curve 4F, during the time interval $T_0$–$T_1$, the transistor 70 is nonconductive and the signal at the junction 100 is "1." During this interval, the capacitor 108 charges by current flowing from the common lead 88 through the resistor 114, the junction 112, and the capacitor 108 to the junction 100. During the time interval $T_0$–$T_1$, because of the charge on the capacitor 108, the transistor 118 is conductive and the junction 130 has the potential of the lead 88. At time $T_1$, when the transistor 70 becomes conductive, the potential of the junction 100 suddenly becomes more positive, approaching the potential of the lead 88, and the capacitor 108, as shown at time $T_1$ on the curve 40, begins to discharge through the resistor 110 and continues to discharge during the time interval $T_1$–$T_2$. However, when the junction 100 suddenly becomes more positive with the capacitor 108 charged, the positive potential at the right hand terminal of the capacitor 108 suddenly increases and provides a positive pulse to the base of the transistor 118, as shown by the curve 4L. This positive pulse overcomes the bias provided through the resistor 119 to cause the transistor 118 to become nonconductive for an instant. A sharp negative pulse then appears at the junction 130 as shown by the curve 4M. The pulses of curves 4L and 4M occur exactly in the region of the time of the point "X" of the curve 4C during the half cycle that L1 is positive. Thus, the pulses occur when the strength of the magnetic field produced by the welding current is a minimum.

Similarly, the transistor 72 receives the signals indicated by the portions B of the curve 4D and by the curve 4H. Between the points *a* and *b* on the curve 4H, the transistor 72 receives a negative signal from the terminal C and therefore conducts so that the capacitor 120 discharges as shown between points *a* and *b* on the curve 4K. At a time indicated at the point *b* on the curve 4H, the signal at the terminal C is removed and the transistor 72 becomes nonconductive causing the capacitor 120 to charge as shown by the curve 4K. At a time indicated at X' on the curve 4C, the signal B changes, as shown on the curve 4D, and becomes a negative pulse which is delivered as an input signal to the transistor 72. This signal causes the transistor 72 to become conductive, thereby changing the signal at junction 104 from a "1" to a "0," as shown by the curve 4J. The charge on the capacitor 120 then begins to decay as indicated at the point *c* on the curve 4K and a sharp positive spike as shown by the curve 4L is impressed on the base of the transistor 118. This causes the transistor 118 to momentarily switch to a nonconductive state whereby the output signal of the transistor 118 provides a negative pulse during the half cycle that L2 is positive as shown by the curve 4M. The pulses of the curves 4L and 4M occur exactly in the region of the time of the point X' of the curve 4C during the half cycle that the supply lead L2 is positive. Thus, pulses occur at the junction 130 during each half cycle when the rate of charge of the welding current is a maximum and the field strength is accordingly, a minimum.

The transformer 150 supplies the emitter to collector circuit of the transistor 136 through a circuit which includes secondary winding 152, terminal 158 of rectifier 154, resistor 160, slider 162, resistor 164, diode 166, junction 142, junction 140, the collector and emitter of transistor 136, common lead 88, resistor 252, junction 254, resistor 258, slider 260, and terminal 156 of rectifier bridge 154. Normally, the transistors 118 and 136 are conducting and the junctions 140 and 142 are at the potential of the common lead 88 and the junction 134 is slightly positive relative to the lead 88. When the transistor 118 ceases conduction during the brief interval of each of the positive spikes of the curve 4M, the junction 130 no longer is tied to the common lead 88 and, the resistors 138, 132, and 133 being properly selected the potential at the junction 134, which is tied to a positive supply through the resistor 138 and to the negative supply through the resistors 132 and 133, becomes slightly negative relative to the common lead 88. This causes the transistor 136 to become momentarily nonconductive so the junctions 140 and 142 are pulsed positive, as shown by the curve 4N, the pulses occurring in the regions of the points X and X'.

From the foregoing it is clear that the air core transformer 54 and its associated circuitry, including the transistors 70, 72 and 118 and the capacitors 108 and 120, constitutes a PNP logic gating circuit which provides a negative pulse at the junction 130 at each instant when the rate of change of welding current through the electrodes 12 and 14 is a minimum. The circuitry associated with the transistors 118 and 136 transfers the PNP type logic to NPN type logic, so that the junctions 140 and 142 are pulsed positive at each instant when the rate of change of welding current flow through the electrodes 12 and 14 is a minimum.

The magnitude of the positive voltage at the junctions 140 and 142 during the gating pulses depends upon the voltage drop across the electrodes 12 and 14, which voltage drop is impressed on the transformer 150, as modified by a signal dependent upon the welding current supplied through the transformer 42. This will now be described.

The diodes of the rectifier 154 supplied from the transformer 150 are poled so that the terminal 158 is positive relative to the terminal 156. As the junction 142 is connected through the diode 166 and the load resistor 164 to the slider 162 of the resistor 160, the junction 142 has a predetermined positive potential relative to the junction 156 which can be selected by adjustment of the slider 162. The collector of the transistor 136 is directly connected to the junction 142 and the emitter is connected through the lead 88 and a portion of the potentiometer 258, as selected by the slider 260, to the terminal 156. Thus the potential between the junction 142 and the terminal 156 and across the transistor 136 is modified by the opposing bias provided by the resistor 258.

As mentioned, the monitor 10 responds to the percentage change in resistance across the weld which occurs during formation of a weld nugget. However, during the formation of the weld nugget, several variables, such as line voltage fluctuations and differences in thickness and mass of the parts, contribute to cause a change in the welding current other than the change in resistance across the weld.

The portion of the monitor 10 now to be described compensates for extraneous welding current variations both at the initiation of the weld period and during the formation of the weld. The primary 46 of the transformer 42 is connected in series with the electrodes 12 and 14. Thus the instantaneous value of the voltage at the secondary 48 and supplied to the terminals F and G is proportional to the instantaneous value of the welding current. The voltage at the terminals F and G is rectified by a full wave rectifier 232 causing the output terminal 236 to be positive. The potential between the terminals 236 and 234 may be varied by adjusting the slider 239 of the rheostat 238. The base current of the transistor 146 is proportional to the potential between the terminals F and G, because the terminals 234 and 236 are interconnected by resistors 242 and 244 which have a common junction 246 connected through a resistor 248 to the base of transistor 146 and the terminal 234 is negative relative to the junction 246 and is connected through the slider 235 of the potentiometer 252 and the lead 88 to the emitter of transistor 146. The potential of the junction 142 is proportional to the current through the transisor 146, because the junction 142 is connected directly to the collector of the transistor 146, and the emitter of the transistor 146 is connected through the lead 88 and the potentiometer resistor 252 including the slider 235 to terminal 234, and the resistor 164 and the diode 166 are connected to the portion of the potentiometer resistor 258, as set by slider 260, by a parallel circuit consisting of the transistors 136 and 146. The current through the transistor 146 is adjustable by the reverse bias provided by the portion of the potentiometer 252 disposed between the slider 235 and the lead 88. The negative 20 volt supply connected to the potentiometer 252 opposes the output of the rectifier 232 and, as the slider is moved toward the −20 volt supply, the resulting increase in the reverse bias between the emitter and base of transistor 146 reduces the current conducted by the transistor 146.

The slider 162 of the potentiometer 160 is adjusted to provide a preselected voltage at the junction 142. This voltage is proportional to the voltage at the terminals D and E and thus at the electrodes 12 and 14, and includes the voltage drop in the electrodes 12 and 14. To compensate for the voltage drop in the electrodes, an opposing bias is provided by the potentiometer 258 through the slider 260 which is connected to oppose the voltage between the terminal 156 and the slider 162. The bias provided by the potentiometer 258 increases the sensitivity to percentage voltage change at the junction 142 which percentage change is detected by a detector which will be hereinafter described.

Figure 5:
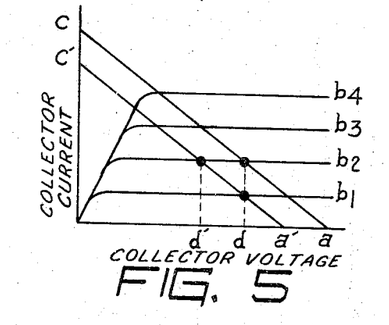
FIG. 5 is a graph illustrating the characteristics of a transistor used in the monitor of FIGS. 1 and 2.

FIG. 5 illustrates the conduction characteristics of a transistor, such as the transistor 146. In FIG. 5, the abscissa represents the collector voltage and the ordinate the collector current. The curves $b1–b4$ are for different values of base to emitter current and the straight slant lines $ac$ and $a'c'$ represent load lines for different values of collector to emitter voltage. As previously indicated, the fixed resistor 164 is connected in series with the emitter to collector of the transistor 146 beween the slider 162 and the terminal 156. If it be assumed that the sliders 162 and 260 are adjusted so that the voltage at the slider 162 has a value of "$a$" and if the transistor 146 has a base to emitter current as represented by the curve "$b2$," then the voltage at the junction 142 has a value of "$d$" which represents the collector voltage of the transistor 146. As previously indicated, the voltage at the slider 162 is responsive to the welding current changes caused by line voltage variations. Further, the detector, which will be hereinafter described, is arranged to detect a predetermined voltage drop at the junction 142. Therefore, upon the welding current being reduced, as by a change in the supply voltage, the voltage at the slider 162 is reduced, as indicated by "$a'''$" on the abscissa of FIG. 5. If the conduction of the transistor 146 were made insensitive to this change in welding current so that the current flow through the base to emitter continued as shown by curve "$b2$," then the collector voltage of transistor 146 of the voltage at terminal 142 would become "$d'$," a value considerably less than "$d$." However, such a decrease in welding current causes a decrease in the voltage at the terminals F and G and thereby a reduction in the current in the base to emitter circuit of the transistor 146 to a value shown by the curve "$B^1$." This decrease in current base to emitter current causes an increase in the collector voltage so that the collector voltage is restored to the original value "$d$."

From the foregoing, it is apparent that the transistor 146 acts as a variable impedance in a circuit in parallel with the transistor 136 so as to maintain the potential at the junction 142 at a value independent of changes in welding current.

As previously stated, the voltage at the junction 142 consists of a series of positive voltage pulses occurring during each half cycle and which have a magnitude representative of the resistance across the welding electrodes as supplied to the terminals D and E. Normally, the transistor 144 is non-conductive and the positive voltage pulses at the junction 142 cause the transistor 144 to conduct with an emitter to collector current representative of the positive voltage pulses at the junction 142. The emitter to collector current of the transistor 144 flows through the diode 174 and the resistor 182 to the junction 184 and charges the capacitor 186, a portion of the current flowing through the potentiometer 190. A portion of the voltage across the potentiometer 190 is selected by the slider 192 and is applied to the base of the transistor 196. The conduction of the transistor 196 is thus dependent upon the potential at the slider 192. The transistors 196 and 200 are connected as an emitter-follower amplifier so that an amplified current representative of the potential at the slider 192 is conducted through the emitter of the transistor 200 and the diode 206 to charge the capacitor 212 to a potential representative of a portion of the charge across the capacitor 186.

Figure 6:
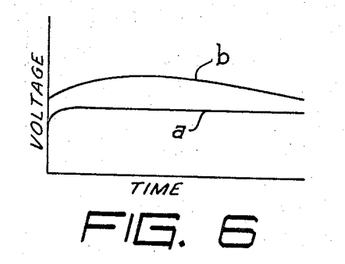
FIG. 6 is a graph depicting voltages on a pair of capacitors in the monitor of FIGS. 1 and 2.

In FIG. 6 of the drawings, the curve "a" designates the charge on the capacitor 212 and the curve "b" designates the charge on the capacitor 186. It will be seen that the potentiometer 190 provides a discharge path for the capacitor 186 so that the potential on the capacitor 186 follows the changes in the potential of the positive pulses at the junction 142. The capacitor 212, however, is not provided with such a discharge path so that its potential is representative of the highest potential at the junction 142. The actual value is selected by the slider 192.

The transistors 180 and 198 are connected to amplify the changes in potential at the capacitor 186, so that, as the potential of the capacitor 186 varies, the potential at the base B2 of the unijunction transistor 210 varies accordingly. As was previously pointed out, the magnitude of the pulses at the junction 142 decrease as the resistance across the weld nugget decreases. This decrease in potential at the junction 142 causes a reduction in the potential across the capacitor 186 and at the junction 216. When the potential at the junction 216 decreases to a predetermined percentage of the charge on the capacitor 212 which decreased potential is equal to the intrinsic stand-off ratio of the unijunction 210, the unijunction transistor 210 becomes conductive and passes current from the emitter E to the base B1 to quickly discharge the capacitor 212. This emitter current flow through the unijunction transistor 210 also causes an increased current between the bases B2 and B1. Prior to the conduction of the unijunction transistor 210, the junction 216 was at a potential approximately equal to the potential of the junction 176 and the junction 218 was at a potential slightly positive with respect to the lead 88. When the unijunction transistor 210 conducts, the potential of the junction 218 becomes more positive relative to the lead 88. The change in potential of junction 218 which occurs upon a predetermined percentage change in resistance across the weld is transmitted through the lead 276 to the logic circuitry portion of the monitor 10.

The logic circuitry utilizes the change in potential at the junction 218 to provide an output signal to the weld timer 20 which, in response to the signal, terminates the flow of welding current through the electrodes. This occurs when a predetermined resistance change has occurred at the interface of the parts being welded before the termination of the weld time period set by the timer 20. The logic circuitry also causes the indicating lamp 62 to glow to indicate that an unsatisfactory weld has been formed if no signal is received at the junction 218 during the weld time period provided by the weld timer 20.

The logic circuitry uses NOR units which are described in the Meyer application supra, wherein it is shown that a transistor in the NOR unit changes its conductive state in response to a change in a negative voltage bias at any of its inputs. If a negative voltage input to a NOR unit is designated as a "1," and the absence thereof is designated as a "0," then the NOR unit provides a "1" signal output whenever all of the signals to its inputs are "0," and will provide a "0" output when a "1" input is present at any one of its inputs.

The logic circuitry receives signals from the weld timer 20 at the terminals A, L, M, and R and from the junctions 216 and 218 of the monitor.

As previously mentioned, the terminal A receives a continuing negative signal during all timing periods except the weld interval. At 85° after voltage zero on the first half cycle of the voltage wave of the source at the beginning of the weld time interval, the signals at the terminals A and L become "0." The signal at the terminal L is restored at 355° during the last half cycle which ends the weld period. At 85° during the first half cycle of welding current, the signal at the terminal M becomes "0" and remains "0" until just prior to 355° during the last half cycle of the weld current. The terminal R is provided with a negative voltage pulse at the end of the squeeze period which precedes the weld period.

When the switch 64 is adjusted so that the movable contact arms are in engagement with the contacts 1 of the respective individual switches, the logic circuitry is rendered inoperative and the welding apparatus is under the exclusive control of the weld timer 20. When the switch 64 is adjusted so that the movable contact arms are in engagement with the other contacts 2, 3, and 4, the logic circuitry is operative to accomplish three different functions selectively.

When the movable contact arms of the switch 64 are on the contacts 2, 3, or 4 during the time intervals other than the weld time interval, the following conditions exist: The "1" signal at the terminal A is supplied as an input to the NOR 282 and the "1" signal at the terminal A' is supplied as an input to the NOR's 270 and 288 causing each of the NOR's 282, 270, and 288 to have a "0" output signal. The "0" output signal of the NOR 270 causes the NOR 272 to provide a "1" signal through the contact 2 of the switch 64b to the amplifier 274 causing the indicating lamp 62 to be illuminated. The "0" signal to the NOR 290 from the NOR 288 causes a "1" output signal at the NOR 290 which charges the capacitor 296 and also provides a "1" input signal to the NOR 282. The "1" signal at the terminal L causes the NOR 298 to have an output signal of "0." The NOR 300 therefore receives a "0" input from the NOR 298 and, if the NOR memory, including the NOR's 300 and 302 is in reset condition, the NOR 300 also receives a "0" input from the NOR 302, so that its output signal is "1" which is transmitted as an input to the NOR 302 to maintain the reset condition of the NOR memory. The "1" input signal to the NOR 304 causes its output to become "0" which is transmitted through the lead 306 to the contact 4 of the switch 64b. In the event that the movable contact arm of the switch 64b is in engagement with its contact 4, the "0" signal from the NOR 304 is transmitted to the indicating lamp 62 to cause the lamp to be extinguished.

The "0" output signal of the NOR 282 is transmitted through the lead 316 to the contact 4 of the switch 64c. In the event that the movable contact arm of the switch 64c is in engagement with its contact 4, this "0" signal is transmitted through the lead 134 to the NOR 310. However, the terminal M at this time provides a "1" signal to the NOR's 310 and 312. The "1" input to the NOR 310 causes a "0" output signal to be present at the terminal K. The "1" input to the NOR 312 causes its output to become "0" which is transmitted as an input to the NOR 298. This signal is without effect because the NOR 298 is receiving a "1" input signal from the terminal L. The NOR 278 has one of its inputs connected to a negative source so that its output continuously remains "0." The NOR 278 has another of its inputs connected to be responsive to the potential at the junction 218. The "0" output of the NOR 278 is supplied to the NOR 280, which also receives a "0" input on another of its input terminals from the NOR 282 with which it is connected as a NOR memory. The "0" inputs to the NOR 280 cause the NOR 280 to have a "1" output signal which is supplied as an input to the NOR 282.

Thus, during timing periods other than the weld period, the lamp 62 is extinguished if the switch 64 is in the positions 1, 2, and 3, and is lit if the switch is in the position 4.

The proper positioning of the slider 162 of the potentiometer 160 to compensate for the resistance of the electrodes 12 and 14 is accomplished as follows:

The weld timer 20 is first adjusted for a realistic welding schedule which would ordinarily provide a satisfactory weld between the work-pieces 16 and 18. That is, the welder is adjusted so that the welding electrodes engage the work-pieces at a proper pressure, the weld time is adjusted so that an acceptable weld should be made, and the magnitude of the welding current is adjusted so that a proper current will flow during the weld time to provide the acceptable weld. Proper adjustment of each of the foregoing is well known, and can be achieved either by experimentation or by consulting any of several well-known handbooks. After the foregoing adjustments have been made and the work-pieces 16 and 18 are positioned between the electrodes 12 and 14, welding current is passed through the work-pieces.

The adjustment of the slider 162 is made with the contact arms of the switch 64 in the second position. When the contact arms are in the second position, the secondary 48 of the transformer 42 is effectively short-circuited by the contact arm 64d causing the transistor 146 to be nonconductive as a result of the bias supplied through the potentiometer 252 by the negative 20 volt source at the lead 105. The contact arm 64c is in an open circuit position and the contact arm 64b conducts the output of the NOR 272 to the amplifier 274. The contact arm 64a is positioned to complete the circuit between the junction 216 and an input of the NOR 270. As previously indicated, during most of the weld interval, the signals at the terminals A, L, and M are "0." The NOR memory, consisting of the NOR's 270 and 272, does not switch when the signal at A' becomes "0" because the output of the NOR 272 remains "1" and the indicating lamp 62 remains lit as long as the positive potential at the junction 216 is insufficient to overcome the negative bias at the input of the NOR 270 which is provided by the output of the NOR 272. As the slider 162 of the potentiometer 160 is moved toward the junction 158, the positive potential at the junction 216 is increased. When the positive potential at the junction 216, as transmitted through the lead 262, the resistor 264, and the diode 268 is sufficient to overcome the negative bias at the other input of the NOR 270, the memory switches and the NOR 270 provides a "1" output signal which causes the NOR 272 to switch and provide a "0" output signal which in turn causes the indicating lamp 62 to become extinguished. When the lamp 62 goes out with the switch 64 in the second position with welding current flowing, the operator is advised that the slider 162 is properly positioned to obtain a voltage signal from the electrodes 12 and 14 which has a proper magnitude for proper operation of the unijunction transistor 210.

After the foregoing adjustment has been made, the switch 64 is moved to the third position and the position of the slider 239 of the potentiometer 238 is adjusted as follows:

The previously selected welding schedule is maintained and the flow of welding current is again initiated. The junction 216 is now connected through the resistor 266 by the contact arm 64a to the input of the NOR 270. The ohmic value of the resistor 266 is selected to be less than the ohmic value of the resistor 264. Thus the positive potential applied as an input to the NOR 270 will be less than the voltage supplied during the set-up when the contact arm 64a was in the second position. With the arm 64d in the third position, the secondary winding 48 is no longer short-circuited. The adjustment of the slider 239 on the rheostat 238 is made by causing the slider to be positioned at a point where the indicating lamp again goes out. When the rheostat 238 is thus adjusted, the transistor 146 bypasses sufficient current so as to maintain the junction 142 at a predetermined voltage level regardless of changes in line voltage.

After the foregoing adjustments of the sliders of the potentiometers 160 and 238 have been made, the monitor 10 is in condition for operation upon movement of the switch 64 to the fourth position.

When the operation of the weld timer 20 is initiated, as by closing the usual initiating switch (not shown), at 85° after zero of the first half cycle of welding current, the signals at the terminals M, L, and A change from "1" to "0." The "0" signal at the terminal M supplied as an input to the NOR 312 switches the NOR 312 to supply a "1" input to the NOR 298. This change in the input prevents the NOR 298 from switching when the terminal L signal changes to "0." Thus, the NOR 298 continues to supply a "0" signal to the NOR 300. The NOR 300 in response to the "0" inputs from the NOR's 298 and 302 continues to supply a "1" signal to the NOR 302 and the NOR 304. Thus the NOR 304 continues to supply a "0" output signal through the lead 306 and the contact arm 64b to the amplifier 274, so that the indicating lamp 62 remains extinguished. The "0" signal at the terminal A applied to the NOR 282 does not switch the NOR 282 because the "1" input from the NOR's 280 and 290 continues.

Three cycles after the signal at the terminal A becomes "0," the signal at A' changes from "1" to "0." The "0" signal at A' is applied to the NOR's 270 and 288. The "0" signal input to the NOR 270 is without effect because the "1" output signal from the NOR 272 continues as an input to the NOR 270 so that the memory does not switch. The "0" input signal to the NOR 288 causes it to switch to provide a "1" input to the NOR 290 causing the NOR 290 to switch and provide a "0" output signal. The change in the output signal of the NOR 290 is delayed for an additional cycle as the charge on the capacitor 296 decays and then is applied to the NOR 282. Therefore, after four cycles of welding current, the NOR 282 receives a "0" input from the terminal A and a "1" input from the NOR 280 because the NOR 280 continues to receive "0" inputs from the NOR's 278 and 290. Thus, the junction 284 continues to have a "0" signal impressed thereon which is conducted through the lead 316 and the contact arm 64c to the lead 314 which is connected as an input to the NOR 310 so that the terminal K continues to have a "1" signal impressed thereon. When the potential at the junction 218 suddenly becomes positive, as a result of the conduction of the unijunction transistor 210, the lead 276 conducts this positive pulse to the input of the NOR 278. The positive pulse is of sufficient magnitude to overpower the negative 20 volt bias on the other input of the NOR 278 and the NOR 278 switches to provide a "1" input to the NOR 280 so that the output of the NOR 280 switches and provides a "0" input to the NOR 282. At this moment, all of the inputs to the NOR 282 are "0" and its ouput signal changes to a "1." The "1" output signal of the NOR 282 is transmitted through the junction 284, the lead 316, the switch arm 64c, and the lead 314, to the NOR 310 so that the NOR 310 switches to provide a "0" signal to the terminal K. The terminal K is connected to the weld timer 20 which in response to the change in signals at the terminal K terminates the flow of welding current to the parts to be welded. It will be seen that the "1" signal at the junction 284 has no effect upon the NOR 298 since, during this interval, the NOR 298 is receiving a "1"

signal from the NOR 312. Thus, the circuit which includes the lamp 62 is not activated to cause the lamp to light.

In the event the unijunction transistor 210 fails to conduct during the weld period, that is, the monitor 10 fails to sense a predetermined percentage change in resistance across the welding electrodes, then the signal at the terminal M becomes "1" at some interval prior to 85° during the last half cycle of welding current. The "1" signal at the terminal M causes the NOR 310 to switch so its output becomes "0" to provide a signal through the terminal K to the weld timer to cause cessation of the welding current. The "1" signal at the terminal M additionally causes the NOR 312 output to switch to "0" so that during the last half cycle the NOR 298 receives a "0" signal input from the NOR 312, a "0" input signal from the terminal L, and a "0" input signal from the NOR 282. Thus, the NOR 298 switches to provide a momentary "1" signal to the NOR 300. The "1" input signal to the NOR 300 causes the memory, including the NOR's 300 and 302, to switch so that the NOR 302 switches to provide a "1" input signal to the NOR 300. The "0" signal of the NOR 300 is impressed as an input to the NOR 304 which causes the NOR 304 to have a "1" output which is conducted through the lead 306 and the switch arm 64b to the amplifier 274 causing the lamp 62 to light thereby to indicate that an insufficient change in the resistance occurred across the welding electrodes to provide a satisfactory weld. The lamp 62 remains lit through the succeeding hold-off and squeeze cycles and, at the end of a subsequent squeeze period, the terminal R receives a momentary "1" signal from the timer which causes the NOR 302 to switch to its conductive state and provide a "0" input to the NOR 300 to switch the memory and cause the lamp 62 to go out.

While a certain preferred embodiment of the invention has been specifically disclosed, it is to be understood that the invention is not limited thereto because many variations will be readily apparent to those skilled in the art. The invention, therefore, is to be given the broadest possible protection within the terms of the following claims.

What is claimed is:

1. In combination with a resistance welder which is arranged to pass welding current through metal parts to be welded, a control for detecting changes in resistance across the metal parts in response to welding current flow through the parts, said control comprising: means for detecting a voltage across said parts a predetermined time interval subsequent to the initiation of welding current flow through the parts, means responsive to the welding current for compensating the detected voltage in response to variations in the welding current, a pair of capacitors, means for charging one of said capacitors to a potential representative of the highest value of said compensated voltage, means for charging the other of said capacitors to a potential continuously representative of the compensated voltage, means responsive to the percentage difference between the potentials on said capacitors for providing an output signal when the percentage difference in said potentials equals a predetermined value, and means including a circuit having NOR logic elements and responsive to the output signal for terminating the flow of welding current upon receipt of said output signal.

2. In combination with a resistance welder which is arranged to pass welding current consisting of alternate half cycles of alternating current through metal parts to be welded, a control for detecting resistance changes across the parts in response to the welding current flow, comprising: a voltage detecting means arranged to provide a voltage signal representative of the voltage drop across said parts resulting from the flow of welding current, compensating means energized by the welding current for varying the voltage signal and thereby providing a compensated voltage signal in response to changes in the current through the parts, means including an air core type transformer energized by the welding current providing a signal pulse at the instants during each half cycle when the alternating current is at a maximum, and detecting means energized by the compensated voltage signal during the presence of a signal pulse for continuously comparing a maximum compensated detected voltage signal with a subsequent detected compensated voltage signal of lesser magnitude, and means arranged to provide an output signal whenever the percentage difference between the maximum signal and the subsequent signal equal a predetermined value.

3. In combination with a resistance welder having a pair of electrodes engageable with and arranged to pass welding current consisting of alternate half cycles of alternating current through metal parts which are to be welded together, a control for detecting changes in resistance across the parts in a zone between the electrodes in response to the flow of welding current, comprising: a voltage detecting means arranged to provide a detected signal representative of the voltage across the parts in response to the flow of the welding current through the parts, said signal having both an induced voltage component and a resistive voltage component, means energized by the welding current for varying the detected signal in response to variations in the welding current and thereby providing a compensated voltage signal having both a resistive and an inductive component, means including an air core type transformer energized by the welding current providing an output signal pulse during intervals when the value of the inductive voltage signal component is zero, and means triggered by the signal pulse and energized by the compensated voltage signal for comparing changes in the compensated voltage signal and providing an output signal whenever the changes in the compensated voltage signal equal a pretermined value.

4. In combination with a resistance welder having a pair of welding electrodes engageable with and arranged to pass welding current consisting of alternate half cycles of alternating current through metal parts which are to be welded together, a control for detecting changes in resistance across the parts in a zone between said welding electrodes in response to the welding current flow through said parts, comprising: a voltage detecting means arranged to provide a voltage signal representative of the voltage across the parts produced by the flow of welding current, means responsive to the welding current for varying the voltage signal in response to changes in the welding current and thereby providing a compensated voltage signal, means including an air core type transformer energized by the welding current providing an output signal pulse during intervals of maximum welding current flow, and means triggered by the output signal pulse and energized by the compensated voltage signal for comparing a difference between an initially detected compensated voltage signal and a subsequently detected compensated voltage signal and for providing an output signal whenever the percentage difference between the compared signals equals a predetermined value.

5. In combination with a resistance welder having a pair of electrodes engageable with and arranged to pass welding current consisting of alternate half cycles of alternating current through metal parts to be welded together, a control for detecting changes in resistance across the parts in a zone between the electrodes in response to a flow of the welding current, comprising: a voltage detecting means arranged to provide a signal representative of the voltage across the parts resulting from the flow of the welding current through the parts, means responsive to the welding current for varying the signal in response to variations in the welding current to provide a compensated voltage signal, means including an air core type transformer energized by the welding current for providing an output signal pulse during the intervals of maximum welding current flow an adjustable predetermined interval after welding current through the electrodes is initiated, and means triggered by the signal pulse and energized by the compensated voltage for comparing a difference between an initial compensated voltage signal and a subsequent compensated voltage signal and providing an output signal whenever the percentage difference equals a predetermined value.

6. The combination as recited in claim 3 wherein the air core type transformer has a toroidal coil inductively coupled to a lead to one of the pair of electrodes.

7. The combination as recited in claim 1 wherein the means responsive to the percentage differences in potentials on the capacitors also is a unijunction transistor.

8. In combination with a resistance welder having a pair of electrodes engageable with and arranged to pass welding current consisting of alternate half cycles of alternating current through metal parts which are to be welded together, a control comprising a pair of leads connected to the electrodes for providing a signal representative of the voltage between the electrodes resulting from the flow of welding current, said representative signal including a resistive component resulting from the resistive voltage drop across the metal parts in a zone between the electrodes and a voltage induced in the leads by the welding current through the electrodes, compensating means including an iron core transformer energized by the welding current for varying the representative signal in response to variations in the welding current to provide a compensated voltage signal, means including a toroidal coil type air core transformer energized by the welding current providing an output signal pulse during each half cycle when the welding current is at a maximum, and detecting means triggered by the signal pulses for sampling the compensated voltage signal and arranged for comparing an initially detected maximum compensated voltage signal with subsequently detected compensated voltage signals of lesser value and for providing an output signal whenever the percentage difference between the compared signals equals a predetermined value.

9. The combination as recited in claim 8 wherein the representative signal is rectified and supplied as a direct current voltage signal which is varied by the compensating means and supplied to the detecting means.

10. The combination as recited in claim 8 wherein the maximum and subsequently detected compensated voltage signals are respectively impressed on a pair of capacitors and a unijunction transistor compares the voltages on the respective capacitors and is rendered conductive when the percentage difference between the voltages equals a predetermined value.

11. The combination as recited in claim 10 wherein the unijunction transistor provides a discharge path for one of the capacitors when the unijunction transistor conducts.

12. The combination as recited in claim 8 wherein an adjustable time delay means prevents the occurrence of an output signal pulse for a predetermined interval after initiation of welding current.

13. In a resistance welding apparatus, the combination comprising: means including a pair of electrodes arranged to pass alternate half cycles of arc welding current through a pair of metal parts, a timer having an output connected to said means for determining the time interval of said welding current, means connected to the electrodes for detecting the voltage across said electrodes in response to the welding current, compensating means responsive to the welding current for compensating the detected voltage for variations in the welding current, sampling means including an air core type transformer having a winding energized by the welding current arranged for sampling the compensated voltage at the instants during each half cycle when the welding current is at a maximum, comparison means energized by the sampled compensated voltage for comparing a maximum sampled voltage with a subsequent sampled compensated voltage and for providing an output signal when the percentage difference between the sampled compensated voltages equals a predetermined value, and a logic circuit means having an input connected to the timer and an input connected to the comparison means and arranged for providing an ouput signal to the timer in response to a signal from the comparison means during the time interval determined by the timer, said logic circuit means also being arranged for actuating an indicating means in response to an absence of a signal from the comparison means during the time interval determined by the timer.

14. The combination as recited in claim 13 wherein the compensating means includes a pair of transistors connected in parallel one of which has its conduction controlled by the compensating means and the other has its conduction controlled by the sampling means.

15. The combination as recited in claim 14 wherein the comparison means includes a pair of capacitors one of which is charged to a potential representative of the highest value of the sampled compensated voltage and the other of said capacitors is charged to a potential continuously representative of the value of the sampled compensated voltage.

16. The combination as recited in claim 15 wherein the comparison means includes a unijunction transistor having three electrodes with one of said electrodes connected to one side of both capacitors and the other two electrodes being respectively connected to the other side of the capacitors.

17. The combination as recited in claim 13 wherein the sampling means includes a means a for delaying the sampling of the compensated voltage for an adjustable time interval after initiation of welding current flow.

18. In a method of controlling the flow of welding current through two or more metal parts which are to be welded together by the electrodes of a resistance welder, the steps comprising:
 (1) passing welding current consisting of alternate half cycles of alternating current of a predetermined magnitude through the electrodes and the parts,
 (2) continuously detecting the voltage drop across the parts, as caused by the welding current through the parts, a predetermined time interval subsequent to the initiation of welding current flow,
 (3) compensating the detected voltage drop for changes in welding current through the parts from the predetermined magnitude to provide a compensated voltage signal,
 (4) sampling the compensated voltage signal during each half cycle at each instant when the welding current is at a maximum,
 (5) comparing the voltage signal which was first sampled when the compensated voltage signal was at a maximum with a subsequently sampled voltage signal of lesser magnitude,
  (5a) preselecting a desirable value for the percentage difference between the compared voltage signals,
 (6) and terminating the flow of welding current when the percentage difference between the compared voltage signals equals a preselected value.

References Cited
UNITED STATES PATENTS
2,508,330  5/1950  Callender et al. ______ 219—110
2,748,380  5/1956  Platte et al. _______ 219—109 X RICHARD M. WOOD, *Primary Examiner.*

R. F. STAUBLY, *Assistant Examiner.*